United States Patent
Richardson

(10) Patent No.: US 9,342,379 B2
(45) Date of Patent: May 17, 2016

(54) LOCK FREE ACQUISITION AND RELEASE OF A SEMAPHORE IN A MULTI-CORE PROCESSOR ENVIRONMENT

(75) Inventor: Raymond Richardson, Richmond, CA (US)

(73) Assignee: WIND RIVER SYSTEMS, INC., Alameda, CA (US)

( * ) Notice: Subject to any disclaimer, the term of this patent is extended or adjusted under 35 U.S.C. 154(b) by 307 days.

(21) Appl. No.: 13/011,116

(22) Filed: Jan. 21, 2011

(65) Prior Publication Data

US 2012/0192194 A1    Jul. 26, 2012

(51) Int. Cl.
*G06F 9/46* (2006.01)
*G06F 9/52* (2006.01)
*G06F 9/30* (2006.01)

(52) U.S. Cl.
CPC ............ *G06F 9/526* (2013.01); *G06F 9/30087* (2013.01); *G06F 9/52* (2013.01); *G06F 9/522* (2013.01); *G06F 9/528* (2013.01)

(58) Field of Classification Search
CPC ....................................................... G06F 9/526
USPC .................... 718/102, 103, 104, 106
See application file for complete search history.

(56) References Cited

U.S. PATENT DOCUMENTS

| | | | |
|---|---|---|---|
| 5,797,004 A * | 8/1998 | Lindholm et al. | 718/104 |
| 6,360,220 B1 * | 3/2002 | Forin | |
| 7,051,026 B2 * | 5/2006 | Berry et al. | |
| 7,089,555 B2 * | 8/2006 | Calvignac et al. | 718/100 |
| 7,299,242 B2 * | 11/2007 | Moir et al. | |
| 7,512,950 B1 * | 3/2009 | Marejka | 718/106 |
| 7,577,798 B1 * | 8/2009 | Moir | G06F 9/526 |
| | | | 711/147 |
| 7,770,170 B2 * | 8/2010 | Rector et al. | 718/102 |
| 7,818,743 B2 * | 10/2010 | Branda et al. | 718/100 |
| 8,368,701 B2 * | 2/2013 | Paltashev et al. | 345/501 |
| 8,924,984 B2 * | 12/2014 | Omara et al. | G06F 9/522 |
| | | | 711/153 |
| 2003/0115476 A1 * | 6/2003 | McKee | 713/193 |
| 2005/0177831 A1 * | 8/2005 | Goodman | G06F 9/3004 |
| | | | 718/100 |
| 2007/0169123 A1 * | 7/2007 | Hopkins | 718/100 |
| 2009/0307694 A1 * | 12/2009 | Cocks et al. | 718/100 |
| 2010/0242043 A1 * | 9/2010 | Shorb | 718/104 |
| 2010/0250809 A1 * | 9/2010 | Ramesh et al. | 710/200 |
| 2010/0333107 A1 * | 12/2010 | Omara et al. | 718/106 |

* cited by examiner

*Primary Examiner* — Meng An
*Assistant Examiner* — Abu Z Ghaffari
(74) *Attorney, Agent, or Firm* — Fay Kaplun & Marcin, LLP

(57) ABSTRACT

A method for an acquisition of a semaphore for a thread includes decrementing a semaphore count, storing a current thread context of the semaphore when the semaphore count is less than a first predetermined value, determining a release count of a pending queue associated with the semaphore where the pending queue indicates unpended threads of the semaphore, and adding the thread to the pending queue when the release count is less than a second predetermined value.

16 Claims, 3 Drawing Sheets

LOCK FREE ACQUISITION AND RELEASE OF A SEMAPHORE IN A MULTI-CORE PROCESSOR ENVIRONMENT

BACKGROUND

An operating system may implement at least one semaphore to determine an order in which processes are to be executed. In particular, the semaphore may be a variable or abstract data type which controls access to a common resource which is used by multiple applications in a parallel programming environment. A counting semaphore may utilize a counter system for a set of available resources. For example, the counting semaphore may include a count representing a maximum number of resources for processes of the operating system. For each process using a resource, the count may be decremented until no further processes may be allocated a resource. Upon a resource becoming free, the count may be incremented so that the counting semaphore may allocate the freed resource to an application.

Conventional semaphores for an operating system may utilize a lock or non-deterministic atomic operators. Conventional semaphores may use locks to isolate the semaphore for a process. However, the locks may result in deadlocks or other impasses that prevent the semaphore from being acquired. Furthermore, complex lock-free algorithms may be difficult to prove correct which may result in misallocation of resources, bypassing of processes queued for allocation of a resource, etc.

Many conventional computer systems have only non-deterministic atomic operators and are forced to use them. Non-deterministic atomic operators may also be difficult as they may remain ambiguous for an acquisition and/or releasing aspect of the semaphore which may also result in common problems associated with locks for the semaphore. Furthermore, the use of non-deterministic atomic operators make it impossible to impose an upper bound on the run-time of the system. For example, non-deterministic atomic operators may enable a limited number of higher level alternatives for a system to select but when the system ultimately selects a higher level alternative, further branching leads to lower level alternatives. Therefore, there are increasing amounts of paths for a system to take which increases the difficulty and complexity related to running the system. In another example, backtracking for failed alternatives also increases the difficulty and complexity of the system. In yet another example, with no backtracking, an iterative process may provide a deterministic result only but the number of loops that are executed are arbitrary.

SUMMARY OF THE INVENTION

The present invention describes a method for an acquisition of a semaphore for a thread. The method comprises decrementing a semaphore count, storing a current thread context of the semaphore when the semaphore count is less than a first predetermined value, determining a release count of a pending queue associated with the semaphore where the pending queue indicates pended threads of the semaphore, and adding the thread to the pending queue when the release count is less than a second predetermined value.

The present invention further describes a method for a release of a semaphore. The method comprises incrementing a semaphore count, determining a pending queue of the semaphore when the semaphore count is less than a first predetermined value where the pending queue indicates pended threads of the semaphore, removing a head item from the pending queue when the pending queue includes at least one pended thread, and incrementing a release count of the pending queue when the pending queue is empty.

DETAILED DESCRIPTION

Figure 1:
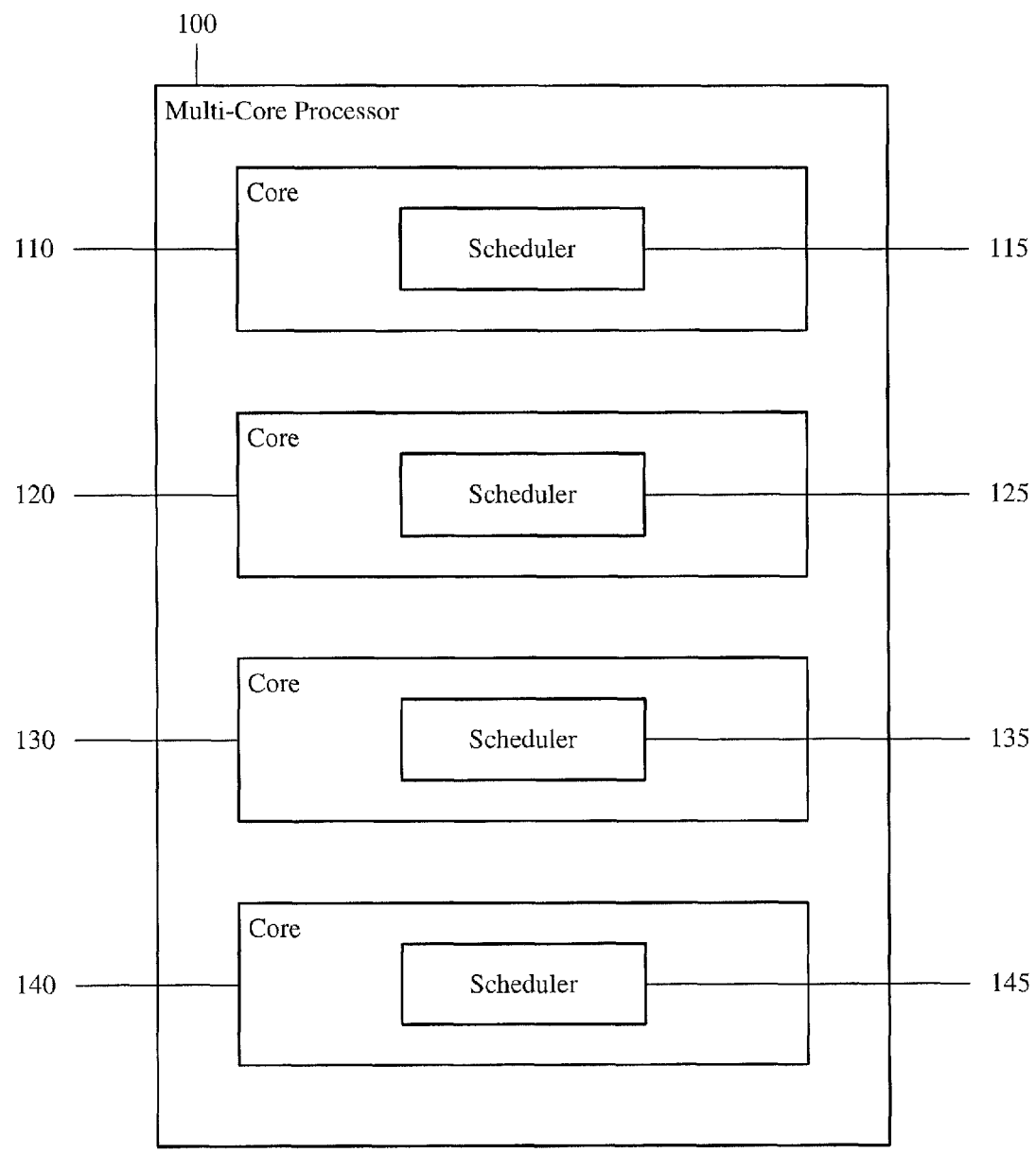
FIG. 1 shows a processor utilizing a semaphore according to an exemplary embodiment.

The exemplary embodiments may be further understood with reference to the following description and the appended drawings, wherein like elements are referred to with the same reference numerals. The exemplary embodiments describe an operating system utilizing a semaphore without a use of locks or non-deterministic atomic operators. Specifically, the semaphore schedules tasks to be executed by resources of the operating system using deterministic atomic operators for acquisition and/or release of the semaphore count. The semaphore, the count, the scheduling, the acquisition, the release, and a related method will be discussed in further detail below.

FIG. 1 shows a multi-core processor 100 according to an exemplary embodiment. The multi-core processor 100 may be configured to utilize a semaphore to schedule tasks to be performed. A semaphore may be for an individual core of the multi-core processor 100. The multi-core processor 100 may include cores 110, 120, 130, 140 and each core may include a scheduler 115, 125, 135, 145, respectively.

It should be noted that the multi-core processor 100 may be a conventional processor utilizing more than one core in which the more than one core is integrated into a single integrated circuit die or integrated in a single chip package. However, it should also be noted that the multi-core processor 100 may also represent any processor system that utilizes more than one core. For example, the multi-core processor 100 may represent more than one uniprocessors that are utilized as a processor system for executing processes. In another example, the multi-core processor 100 may represent a conventional multi-core processor and at least one uniprocessor to comprise the processor system. Those skilled in the art will understand that the exemplary embodiments may relate to any processing system such as those described above.

The cores 110, 120, 130, 140 may be processing units that comprise the multi-core processor 100. According to the exemplary embodiments, a software program may be run exclusively on one of the cores 110, 120, 130, 140. That is, the software program may be executed by only one of the cores 110, 120, 130, 140. However, it should be noted that each of the cores 110, 120, 130, 140 may be responsible for multiple software programs and, therefore, the number of software programs is not limited by the number of cores.

Each of the cores 110, 120, 130, 140 may include a respective scheduler 115, 125, 135, 145. The schedulers 115, 125, 135, 145 may be a managing unit for each semaphore. That is, the schedulers 115, 125, 135, 145 may manage the software running on the cores, in particular for scheduling threads on the respective core.

According to the exemplary embodiments, the management of the semaphores for the multi-core processor 100 may be performed without a need for locks or non-deterministic atomic operations. Specifically, The management of the semaphores relies on an ability to send short messages between software objects running on different cores without the use of spinlocks or atomic operators. The semaphores used in the exemplary embodiments may function in a substantially similar manner as those used in conventional systems. For example, the count for the semaphore may be represented as an integer.

According to the exemplary embodiments, the acquiring operation of a semaphore may be performed without the use of locks. Initially, a variable representing a semaphore's count may be atomically decremented when attempting to acquire the semaphore. The semaphore's count may represent a set of available resources in which the semaphore may task operations. Thus, if the result after the decrementing is greater than −1, then the scheduler of the core may consider the semaphore to be successfully acquired by the task to be performed. When an operation is to be queued on the semaphore, those skilled in the art will understand that any communication means may be used such as the software sending a signal to the multi-core processor 100 which forwards the signal to a respective core.

If the result after the decrementing is less than or equal to −1, then the acquiring operation may first save a currently executing thread's context (since all resources are in use). That is, a list of the pending operations to be performed by the core which is scheduled by the semaphore is stored. The acquiring operation may then switch to a "scheduler stack" which is local to the scheduling software on the current core. The signal or message sent by the multi-core processor 100 to the respective core may be received by the respective scheduler of the core which is interpreted as a request that the current thread be added to its list of threads pending for the semaphore. The operation may be saved to the list upon receiving the request. It should be noted that if the core is the manager of the semaphore, then the manager side may execute the acquire by a function call in contrast to using a signal/message. Subsequently, the scheduler of the core may execute a scheduling decision regarding running a next available thread of the semaphore. It should be noted that the term "pend" and variations thereof may generally relate to the more conventional term "block" and variations thereof when referring to operating systems. Thus, the term "pend" may be used interchangeably with the term "block."

The above describes a general acquiring operation for a new operation according to the exemplary embodiments. The acquiring operation performed by the scheduler or the manager of the semaphore may also include further steps. The scheduler may initially lock interrupts to prevent a new operation from preempting pending operations already listed on the semaphore. The scheduler may then check a "release count" of the pending queue. When the check is greater than 0, then the scheduler may decrement the release count. Thus, the thread is not added to the pending queue and the acquiring operation is run using conventional means. When the check is equal to 0, then the thread identification of the new operation may be added to the pending queue as described above. The scheduler may use appropriate ordering algorithms to determine where the thread identification fits in the pending queue. For example, a high priority operation may take precedence on the pending queue. When the thread identification is added to the semaphore in either scenario, the scheduler may unlock the interrupts and continue operation.

According to the exemplary embodiments, the releasing operation for a semaphore may be performed without the use of non-deterministic atomic operators. Initially, the general release operation may include atomically incrementing the variable representing the semaphore's count. Thus, for the general release operation, if the result of the incrementing is greater than 0, then the release successfully occurred as the semaphore count indicates that the semaphore may readily accept at least one more operation on the calling thread. If the result of the incrementing is less than or equal to zero, a "release" message may be sent to the scheduler of the core. It should be noted that according to this exemplary embodiment, the releasing operation may only be implemented without the use of non-deterministic atomic operators in which atomically incrementing and decrementing are deterministic operations.

The above describes a general releasing operation for a semaphore according to the exemplary embodiments. The releasing operation performed by the scheduler or the manager of the semaphore may also include further steps. Initially, the manager may lock interrupts. The manager may then check whether the pending queue discussed above relating to the addition of a new operation to the semaphore count when the count is less than zero is empty. If the pending queue is empty, the manager may increment the "release count". If the pending queue is not empty, the manager may remove a head item of the pending queue (i.e., a first item on the list). The manager may then unlock the interrupts and schedule the unpended thread.

According to the exemplary embodiments, the lock free scheduling of threads may assume that at all times, a thread has certain properties. First, the thread may be assumed to be in a blocked state and owned by an object such as a semaphore. Second, the thread may be assumed to be in a ready state and owned by a scheduler which schedules the thread for a following execution. Third, the thread may be assumed to be in transition from either ready to blocked or vice versa. Regarding the transition, a thread may be scheduled (i.e., transition from blocked to ready) by sending a message to a respective scheduler to add a thread to the ready queue of the scheduler and run the thread when appropriate. A thread may be descheduled (i.e., transition from ready to blocked) by sending a message to the manager of the object which eventually holds the thread. Therefore, the exemplary embodiments only require a locking of interrupts (not semaphores) to protect scheduler data structures.

Figure 2:
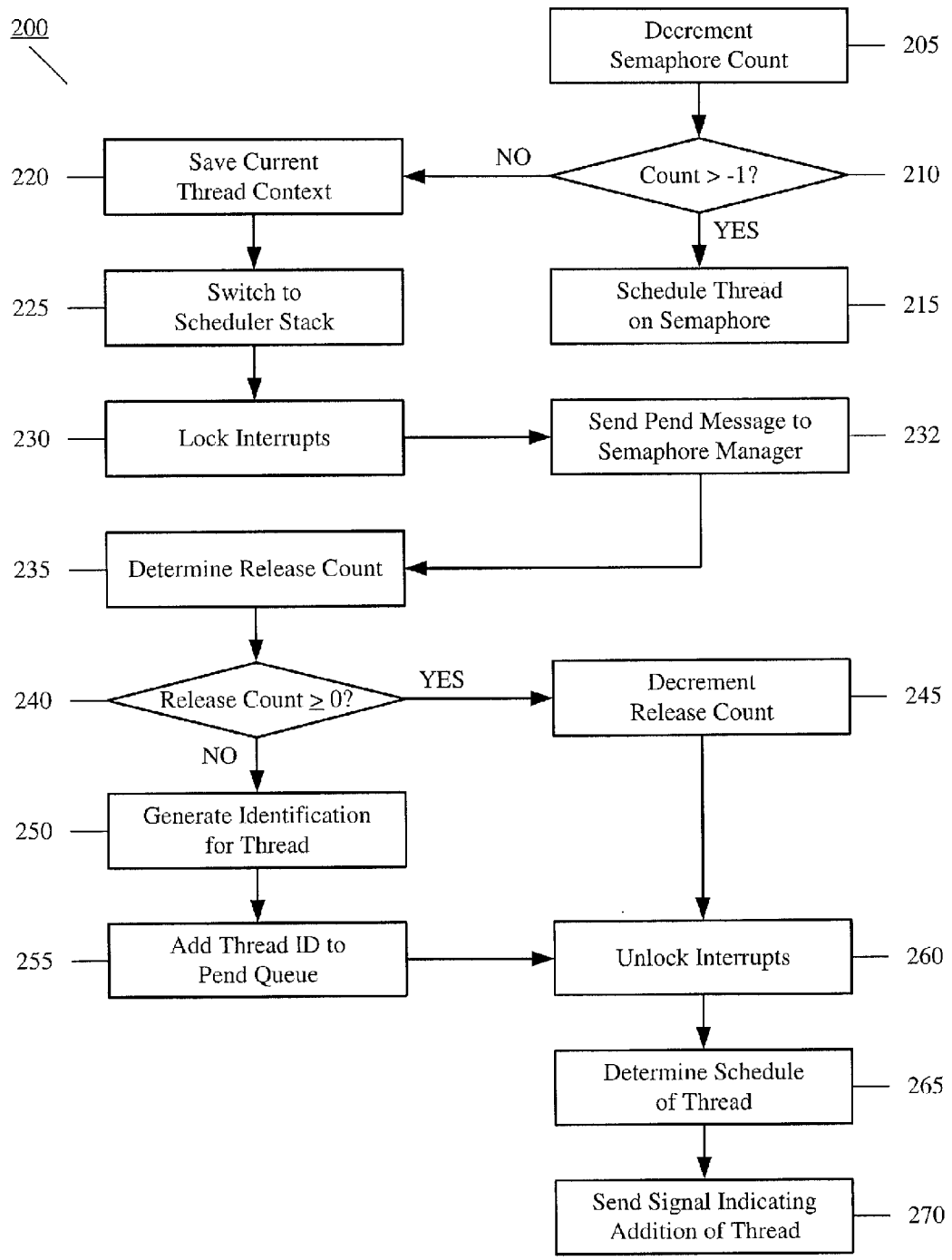
FIG. 2 shows a method for acquiring a semaphore according to an exemplary embodiment.

FIG. 2 shows a method 200 for acquiring a semaphore according to an exemplary embodiment. As discussed above, the acquisition of a semaphore may be performed without the use of locking the semaphore. The method 200 will be described with reference to a thread being added to a queue of a semaphore for one of the cores 110, 120, 130, 140 via the respective scheduler 115, 125, 135, 145 of FIG. 1.

In step 205, a new thread is attempting to be acquired by a semaphore designated for executing the thread. Thus, the selected semaphore decrements the count as commonly performed when acquiring the semaphore. In step 210, a determination is made whether the semaphore count is greater than −1. If the semaphore count is greater than −1, the method 200 continues to step 215 where the new thread is scheduled on the semaphore.

If the semaphore count is less than or equal to −1, the method 200 continues to step 220. In step 220, the current thread context of the semaphore is saved. As discussed above, the pending queue including a list of threads to be executed on the semaphore is saved.

In step 225, the semaphore switches to a scheduler stack to include the new thread despite the semaphore count being less than or equal to −1. As discussed above, the scheduler stack may be local to the scheduling software on the selected core.

In step 230, the scheduler of the core locks interrupts on the semaphore. In step 232, a pend message is sent to the semaphore manager. Specifically, as will be described in further detail below, steps 235-260 are performed on the semaphore manager. In step 235, the release count of the pending queue (i.e., a further count related to the semaphore) is determined. In step 240, if the release count is greater than or equal to zero, the method 200 continues to step 245 where the release count is decremented. Substantially similar to the semaphore count, the release count may relate to a threshold in which further threads may be added to the pending queue.

If the release count is equal to zero, the method continues to step 250 where an identification is generated for the new thread. In step 255, the thread identification is added to the pending queue. Thus, the scheduler stack further includes the new thread being represented as the thread identification. It should be noted that the use of the scheduler stack is only exemplary. Thus, the method 200 may not include a switch to the scheduler stack but the method 200 may still be implemented.

In step 260, the interrupts are unlocked. In step 265, the scheduler determines a scheduling for the new thread in relation to the context thread (i.e., list of pending threads on the semaphore). Thus, if the new thread has a high priority, the new thread may be shifted to a position in which a more immediate execution of the thread may be performed. In a first example, the new thread may be placed among the pended threads of the pending queue. If the new thread has a low priority, the new thread may be placed at the bottom of the pending queue. If the new thread has a high priority, the new thread may be placed over other pended threads of the pending queue, thereby shifting all lower priority pended threads behind the new thread. In a second example, the new thread may further be placed among the pending threads of the semaphore. For example, the new thread may be an extremely high priority item that requires immediate attention. In such a case, the new thread may bypass the pending queue and be placed among the pending threads of the semaphore already scheduled. In such an embodiment, a lowest priority item of the pending threads may be shifted into the pending queue as an unpended thread. In step 270, the processor may send a signal to the semaphore indicating the addition of the thread. It should be noted that steps 265 and 270 are performed on the original core.

The method 200 of FIG. 2 may be represented with the following pseudocode. For example, the following pseudocode may illustrate a set of instructions that may be executed for a program that executes the acquisition of a semaphore.

```
swithToSchedulerStack( )
if (semaphoreManager(sem) == thisCore) {
    processPend(sem, thisThread);
}
else{
    sendMessage(semaphoreManager(sem), processPend, sem,
thisThread);
}
runNextScheduledThread( );
processPend(sem, thread)
{
    lockInterrupts( );
    if (releaseCount(sem) > 0) {
        decrementReleaseCount(sem);
        unLockInterrupts( );
        scheduleThread(thread);
    }
    else{
        addThreadToPendQueue(sem, thread);
        unLockInterrupts( );
    }
}
```

According to the above pseudocode, an initial step may relate to step 225 of the method 200 described above in which the semaphore switches to the scheduler stack. The command sendMessage(coreNumber, function, semaphore, thread) may cause a function to be executed with parameters of semaphore and thread on a core of coreNumber. As discussed above, locks are interrupted and thus, this thread may be executed in interrupt context on coreNumber. The commands lockInterrupts and unLockInterrupts may thus disable and enable interrupts, respectively. The semaphoreManager(sem) may return the core number which is the manager of the semaphore sem. The command runNextScheduledThread( ) may invoke the scheduler to execute the next available thread. The command decrementReleaseCount(sem) may decrement the release count of the semaphore sem. The command scheduleThread(thread) may place a thread into the scheduler making it available to run. The command addThreadToPendQueue(sem, thread) may add a thread to the pending queue of the semaphore sem. It should again be noted that the initial switch to the scheduler stack is only exemplary and the pseudocode may remove this item should no switch take place.

Figure 3:
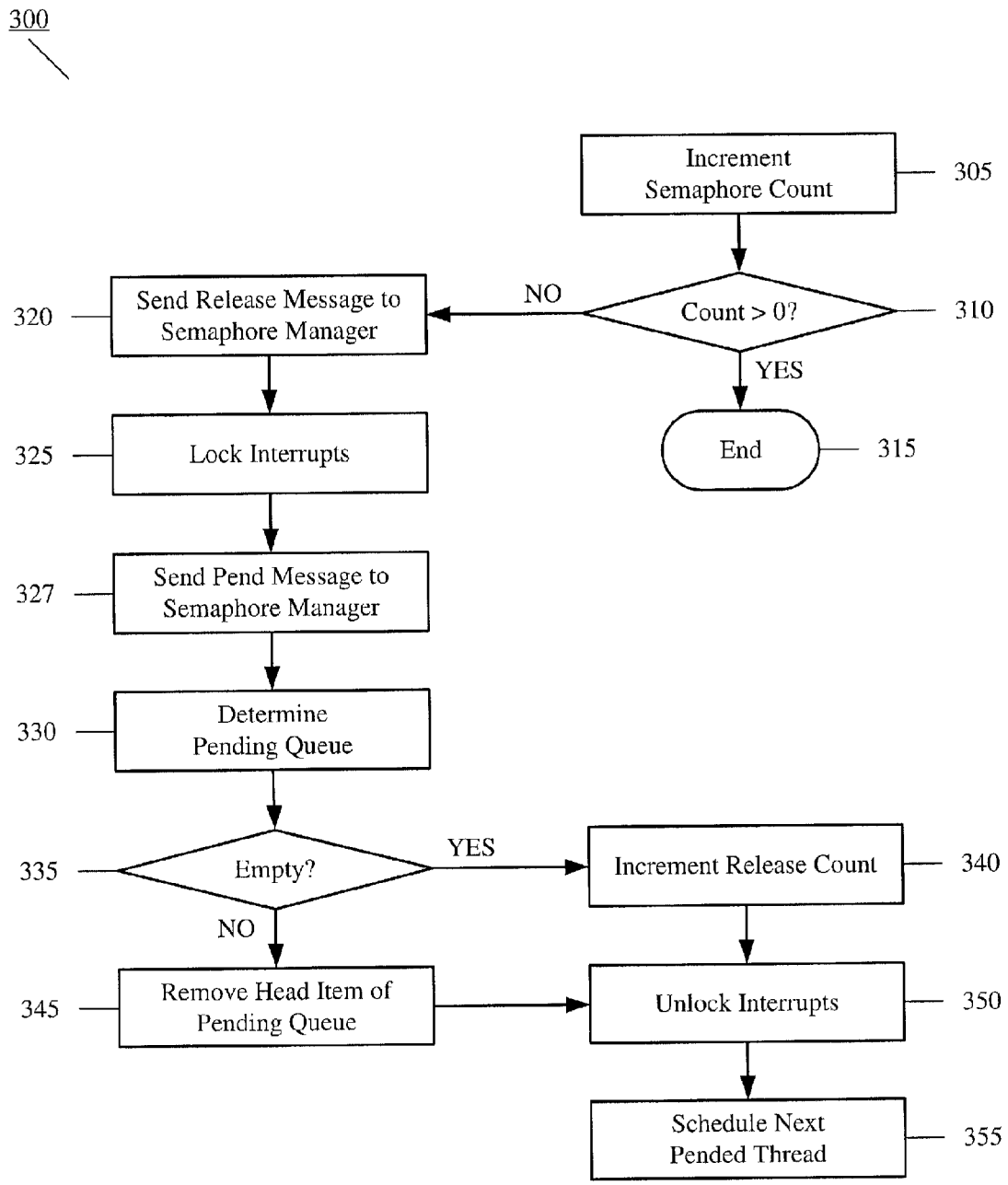
FIG. 3 shows a method for releasing a semaphore according to an exemplary embodiment.

FIG. 3 shows a method 300 for releasing a semaphore according to an exemplary embodiment. As discussed above, the releasing of a semaphore may be performed without using non-deterministic atomic operators. It should be noted that hardware that does not have a deterministic increment/decrement functionality may still utilize non-deterministic atomic operators. The method 300 will be described with reference to a thread no longer requires resources and freeing a semaphore for one of the cores 110, 120, 130, 140 via the respective scheduler 115, 125, 135, 145 of FIG. 1.

In step 305, a scheduled thread no longer requires resources and thus, the designated semaphore for the executed thread increments the count as commonly performed when releasing the semaphore. In step 310, a determination is made whether the semaphore count is greater than zero. If the semaphore count is greater than or equal to zero, the method 300 ends at step 315.

If the semaphore count is less than or equal to zero, the method 300 continues to step 320. In step 320, the processor sends a release message to the manager of the semaphore. This message may indicate that the semaphore remains to have a negative semaphore count which further indicates the pending queue. Thus, in step 325, the manager locks interrupts. In step 327, a pend message is sent to the semaphore manager. Specifically, as will be described in further detail below, steps 325-350 are performed on the semaphore manager. In step 330, the pending queue of the semaphore is determined. In step 335, if the pending queue is empty, the method 300 continues to step 340 where the release count of the pending queue is incremented. If the pending queue is not empty, the method 300 continues to step 345 where the head item of the pending queue is removed. In step 350, the manager unlocks the interrupts. In step 355, the next pended thread of the pending queue is scheduled. It should be noted that step 355 is performed on the original core (i.e., calling core).

The exemplary embodiments may incorporate further measures that utilize the completely lock-free aspect for providing improved validation and deletion safety when performing concurrent acquisition/release of a semaphore. Specifically, the operation includes management of an object table data structure. The data structure may be a table with rows representing objects or semaphores that may be allocated or free. Objects may be referred to by index in the table (e.g., row number) and a generation number which refers to the number of times that the row has been allocated.

In standard terminology, the acquisition of a semaphore is accomplished using the P operation or decrementing the semaphore count while the release of a semaphore is accomplished using the V operation or incrementing the semaphore count. According to the exemplary embodiments, validation of the identification may be performed by matching a generation number of the row with the generation number of the identification. Deletion safety may be implemented using a Boolean flag which indicates that a row is to be deleted. To accomplish the above, the methodology may set several rules for operating these values.

In a first exemplary rule, the generation number may be incremented on deletion of an object. In a second exemplary rule, once a deletion flag is set, the P operation will always fail with an error (object deleted). In a third exemplary rule, deletion may not actually be done until the semaphore count is non-negative. To appropriately set the values, a single atomic variable may be used which may be manipulated with a Compare and Swap or a Load-Linked/Store-Conditional routine.

Therefore, according to the exemplary embodiments, the rules for operating a semaphore may be established. For an acquisition of a semaphore, a first exemplary rule may be when the count is positive (before acquisition) and the delete flag is not set. Then the count is decremented and the acquisition is complete. In a second exemplary rule for an acquisition, if the count is zero or negative (before acquisition) and the delete flag is not set, the acquiring thread must pend. For a release of a semaphore, a first exemplary rule may be when the count is less than −1 (before release). Then one waiter is unpended and the semaphore continues. In a second exemplary rule for a release, the Generation Number may be incremented and the delete flag cleared when the result of incrementing the semaphore count is zero or greater. Using these rules for operating the values and operating the semaphore, the operations may be performed on all three fields simultaneously with an appropriate atomic operator to provide good validation and complete deletion safety without the use of locks.

The above described exemplary embodiments provide a use of a semaphore in multi-core processors that do not require the use of conventional locks and/or non-deterministic atomic operators. Specifically, the acquisition of the semaphore may be performed without the use of locks while the release of the semaphore may be performed without the use of atomic operators. The exemplary embodiments may also enable overriding conventional prevention of the acquisition of the semaphore. Specifically, when a conventional semaphore has a count that is negative, the semaphore is no longer accessible. In contrast, the exemplary embodiments provide for a mechanism to add any new threads to even a semaphore with a negative count. The release of the semaphore is also provided with a mechanism to address when the semaphore has additional threads in a pending queue beyond the semaphore count. It should be noted that this operation requires either Compare-and-Swap or Load-Linked/Store-Confidential which are non-deterministic atomic operators. It should also be noted that this operation may not implemented with deterministic operators.

Those skilled in the art will understand that the above described exemplary embodiments may be implemented in any number of manners, including, as a separate software module, as a combination of hardware and software, etc. For example, the semaphore operations may be a program containing lines of code that, when compiled, may be executed on the processor 100.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
acquiring a semaphore for a current thread from a data structure, wherein the data structure associates the semaphore with a generation number;
concurrently with acquiring the semaphore, identifying the associated generation number as one of valid and invalid;
concurrently with acquiring the semaphore, identifying a deletion flag as one of set and not set;
decrementing a semaphore count of the semaphore upon acquisition of the semaphore when the associated generation number is identified as valid and the deletion flag is identified as not set, wherein the acquisition of the semaphore and a scheduling of the acquisition of the semaphore are both not controlled with a lock;
initializing a scheduler stack upon storing a current thread context of the semaphore when the semaphore count is less than or equal to a first predetermined value;
locking interrupts to prevent a new operation from preempting a pending operation on the semaphore upon initializing the scheduler stack;
determining a release count of a pending queue associated with the semaphore, the release count is determined based on a predetermined threshold number of threads that can be added to the pending queue of the semaphore;
generating a thread identification for the current thread when the release count is zero; and
adding the thread identification to the pending queue as a representation of the current thread when the release count is less than a second predetermined value.

2. The method of claim 1, further comprising:
scheduling the current thread on the semaphore when the semaphore count is greater than the first predetermined value.

3. The method of claim 1, further comprising:
unlocking the interrupts of the semaphore upon adding the current thread to the pending queue.

4. The method of claim 1, further comprising:
decrementing the release count when the release count is greater than or equal to the second predetermined value.

5. The method of claim 1, wherein the current thread is scheduled among the pended threads as a function of priority.

6. The method of claim 5, wherein the current thread is further scheduled among the pending threads of the semaphore.

7. The method of claim 6, wherein a position of a lowest priority thread scheduled on the semaphore is shifted into the pending queue behind a higher priority thread.

8. The method of claim 1, wherein the first predetermined value is −1 and the second predetermined value is 0.

9. A method, comprising:
releasing a semaphore for a current thread from a data structure, wherein the data structure associates the semaphore with a generation number;
concurrently with releasing the semaphore, incrementing the associated generation number;

concurrently with releasing the semaphore, setting a deletion flag;
incrementing a semaphore count of the semaphore upon release of the semaphore, wherein the release of the semaphore and a scheduling of the release of the semaphore are both not controlled with a lock;
locking the interrupts of the semaphore upon initializing a scheduler stack;
determining the presence of a thread in a pending queue of the semaphore when the semaphore count is less than or equal to a first predetermined value, the pending queue including a representation of a current thread, a release count based on a predetermined threshold number of threads that can be added to the pending queue of the semaphore; and
removing a head item from the pending queue, based on the pending queue determination, when the pending queue includes at least one pended thread, the head item being a pended thread.

10. The method of claim 9, wherein the first predetermined value is 0.

11. The method of claim 9, further comprising:
sending a release message to a scheduler of the semaphore indicating that the semaphore count is less than or equal to the first predetermined value and instructing the head item to be removed from the pending queue, wherein the instructing is based on the pending queue determination.

12. The method of claim 9, further comprising:
unlocking the interrupts of the semaphore upon removing the head item of the pending queue.

13. The method of claim 9, further comprising:
incrementing the release count when the pending queue is empty.

14. The method of claim 9, further comprising:
scheduling a next unpended thread for execution by a processing core if the pending queue still includes at least one unpended thread.

15. A non-transitory computer readable storage medium with an executable program stored thereon, wherein the program instructs a processor to perform operations comprising:
acquiring a semaphore for a current thread from a data structure, wherein the data structure associates the semaphore with a generation number;
concurrently with acquiring the semaphore, identifying the associated generation number as one of valid and invalid;
concurrently with acquiring the semaphore, identifying a deletion flag as one of set and not set;
decrementing a semaphore count of the semaphore upon acquisition of the semaphore when the associated generation number is identified as valid and the deletion flag is identified as not set, wherein the acquisition of the semaphore and a scheduling of the acquisition of the semaphore are both not controlled with a lock;
initializing a scheduler stack upon storing a current thread context of the semaphore when the semaphore count is less than or equal to a first predetermined value;
locking interrupts to prevent a new operation from preempting a pending operation on the semaphore upon initializing the scheduler stack;
determining a release count of a pending queue associated with the semaphore, the release count is determined based on a predetermined threshold number of threads that can be added to the pending queue of the semaphore;
generating a thread identification for the current thread when the release count is zero; and
adding the thread identification to the pending queue as a representation of the thread when the release count is less than a second predetermined value.

16. The non-transitory computer readable storage medium of claim 15, wherein the operations further comprise:
releasing a semaphore for a current thread from a data structure, wherein the data structure associates the semaphore with a generation number;
concurrently with releasing the semaphore, incrementing the associated generation number;
concurrently with releasing the semaphore, setting a deletion flag;
incrementing the semaphore count upon release of the semaphore, wherein the release of the semaphore and a scheduling of the release of the semaphore are both not controlled with a lock;
locking the interrupts of the semaphore upon initializing a scheduler stack;
determining the pending queue of the semaphore when the semaphore count is less than or equal to the second predetermined value; and
removing a head item from the pending queue when the pending queue includes at least one pended thread.

* * * * *